(12) United States Patent
Yang et al.

(10) Patent No.: US 11,358,619 B2
(45) Date of Patent: Jun. 14, 2022

(54) INCLINED HANDCART

(71) Applicants: Li-Ling Yang, Keelung (TW); Chen Huan Hsieh, Keelung (TW)

(72) Inventors: Li-Ling Yang, Keelung (TW); Chen Huan Hsieh, Keelung (TW)

( * ) Notice: Subject to any disclaimer, the term of this patent is extended or adjusted under 35 U.S.C. 154(b) by 183 days.

(21) Appl. No.: 16/984,184

(22) Filed: Aug. 4, 2020

(65) Prior Publication Data

US 2020/0361507 A1 Nov. 19, 2020

(51) Int. Cl.
*B62B 3/02* (2006.01)
*B62B 5/06* (2006.01)
*B62B 3/00* (2006.01)

(52) U.S. Cl.
CPC .............. *B62B 3/022* (2013.01); *B62B 3/005* (2013.01); *B62B 5/067* (2013.01)

(58) Field of Classification Search
CPC .......... B62B 3/022; B62B 3/005; B62B 5/067
See application file for complete search history.

(56) References Cited

U.S. PATENT DOCUMENTS

| 2,945,699 | A | * | 7/1960 | Berlye | ..................... B62B 3/10 |
| | | | | | 211/27 |
| 2020/0307665 | A1 | * | 10/2020 | Su | ........................... B62B 3/022 |
| 2021/0284221 | A1 | * | 9/2021 | Perez | ........................ B62B 3/12 |

* cited by examiner

*Primary Examiner* — Bryan A Evans

(57) ABSTRACT

An inclined handcart includes a frame including two hook-shaped rearward inclined members at two sides respectively; two wheel mounts secured to bottoms of two front corners of the frame respectively; two rear wheels rotatably secured to two rear ends of the rearward inclined members respectively; two front casters rotatably secured to the wheel mounts respectively; a plurality of links interconnecting the rearward inclined members; two plate members mounted on the rearward inclined members respectively, each plate member having a shoulder extending inward; and a first limit board extending from the rear ends of the rearward inclined members.

19 Claims, 17 Drawing Sheets

US 11,358,619 B2

INCLINED HANDCART

BACKGROUND OF THE INVENTION

1. Field of the Invention

The invention relates to handcarts and more particularly to an inclined handcart having a mechanism for adjusting an inclined angle of a front limit board on a load-carrying platform in the direction of the length.

2. Description of Related Art

There is a conventional handcart having a mechanism for adjusting an inclined angle of a limit board on a load-carrying platform in the direction of the length. However, the mechanism is complicated and prone to malfunction.

Thus, the need for improvement still exists.

SUMMARY OF THE INVENTION

It is therefore one object of the invention to provide an inclined handcart comprising a frame including two hook-shaped rearward inclined members at two sides respectively; two wheel mounts secured to bottoms of two front corners of the frame respectively; two rear wheels rotatably secured to two rear ends of the rearward inclined members respectively; two front casters rotatably secured to the wheel mounts respectively; a plurality of links interconnecting the rearward inclined members; two plate members mounted on the rearward inclined members respectively, each plate member having a shoulder extending inward; and a first limit board extending from the rear ends of the rearward inclined members.

The above and other objects, features and advantages of the invention will become apparent from the following detailed description taken with the accompanying drawings.

DETAILED DESCRIPTION OF THE INVENTION

Figure 1:
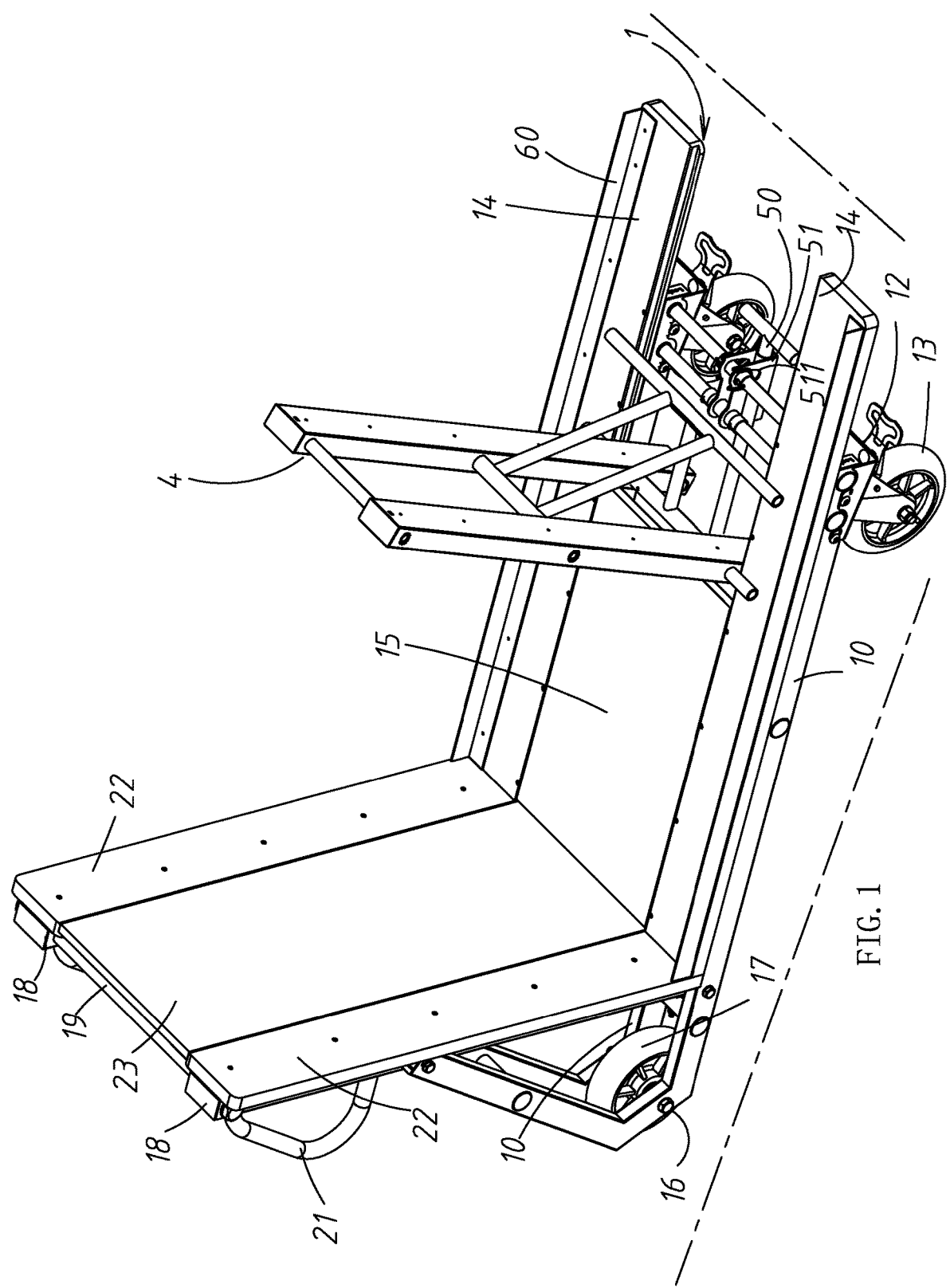
FIG. 1 is a perspective view of an inclined handcart according to a first preferred embodiment of the invention.
Figure 1A:
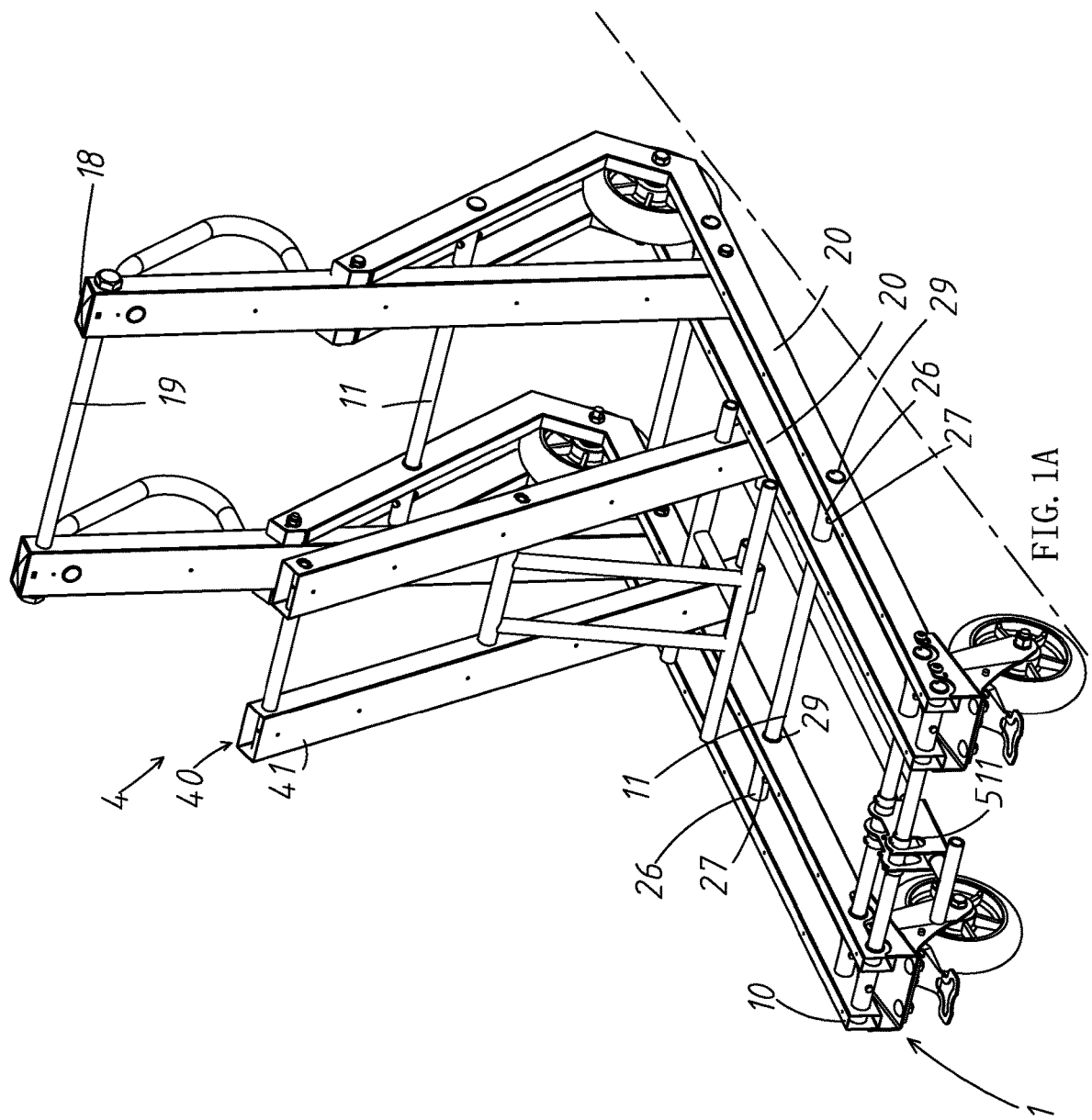
FIG. 1A is another perspective view of the handcart with both the intermediate load-carrying platform and the back board removed.
Figure 1C:
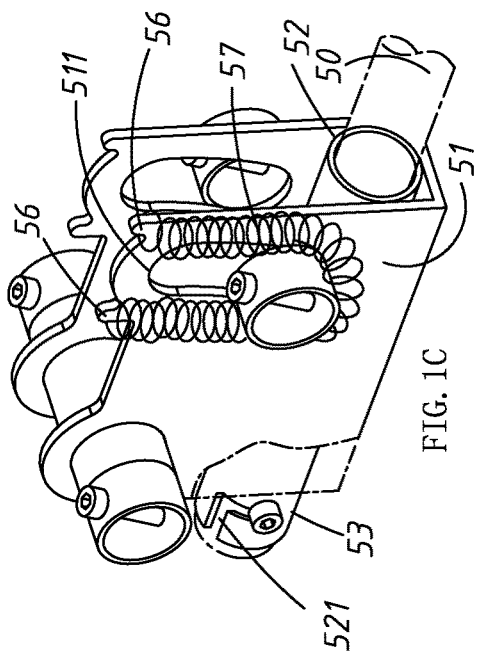
FIG. 1C is a perspective view of the seat, the sleeve having a groove at a rear end.
Figure 1D:
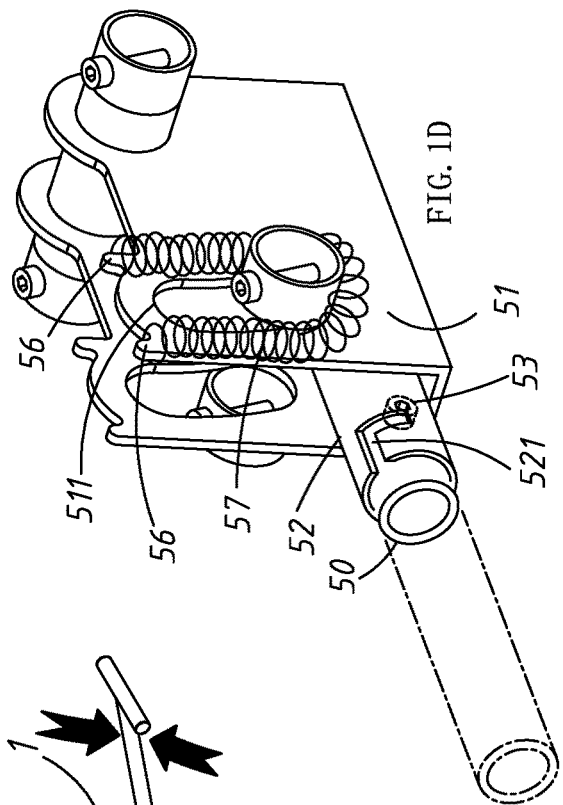
FIG. 1D is a perspective view of the seat in a second configuration where the sleeve has a groove at a front end.
Figure 1B:
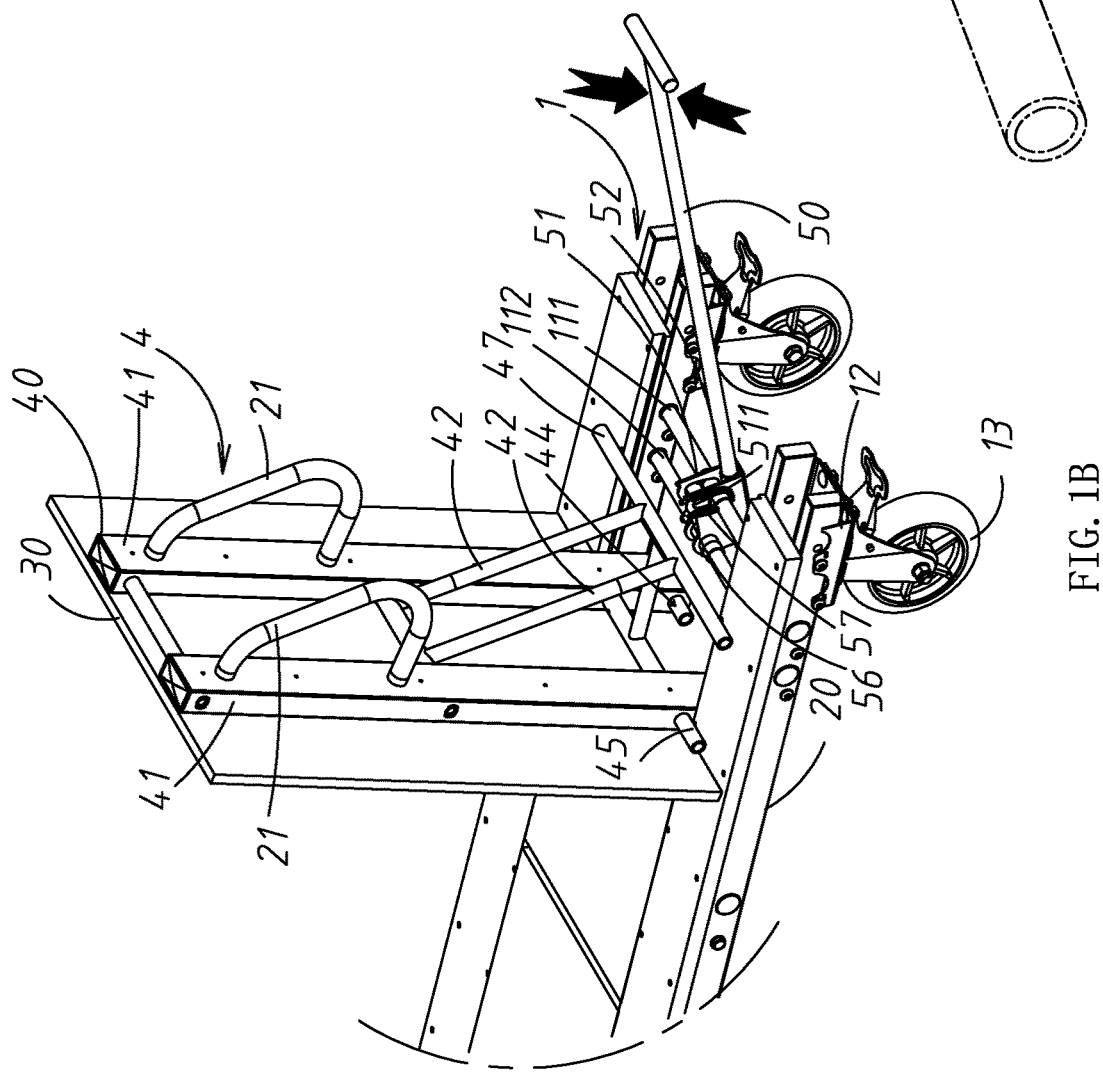
FIG. 1B is an enlarged view of the right side of FIG. 1 with the handle pulled and pivoted upward.
Figure 2:
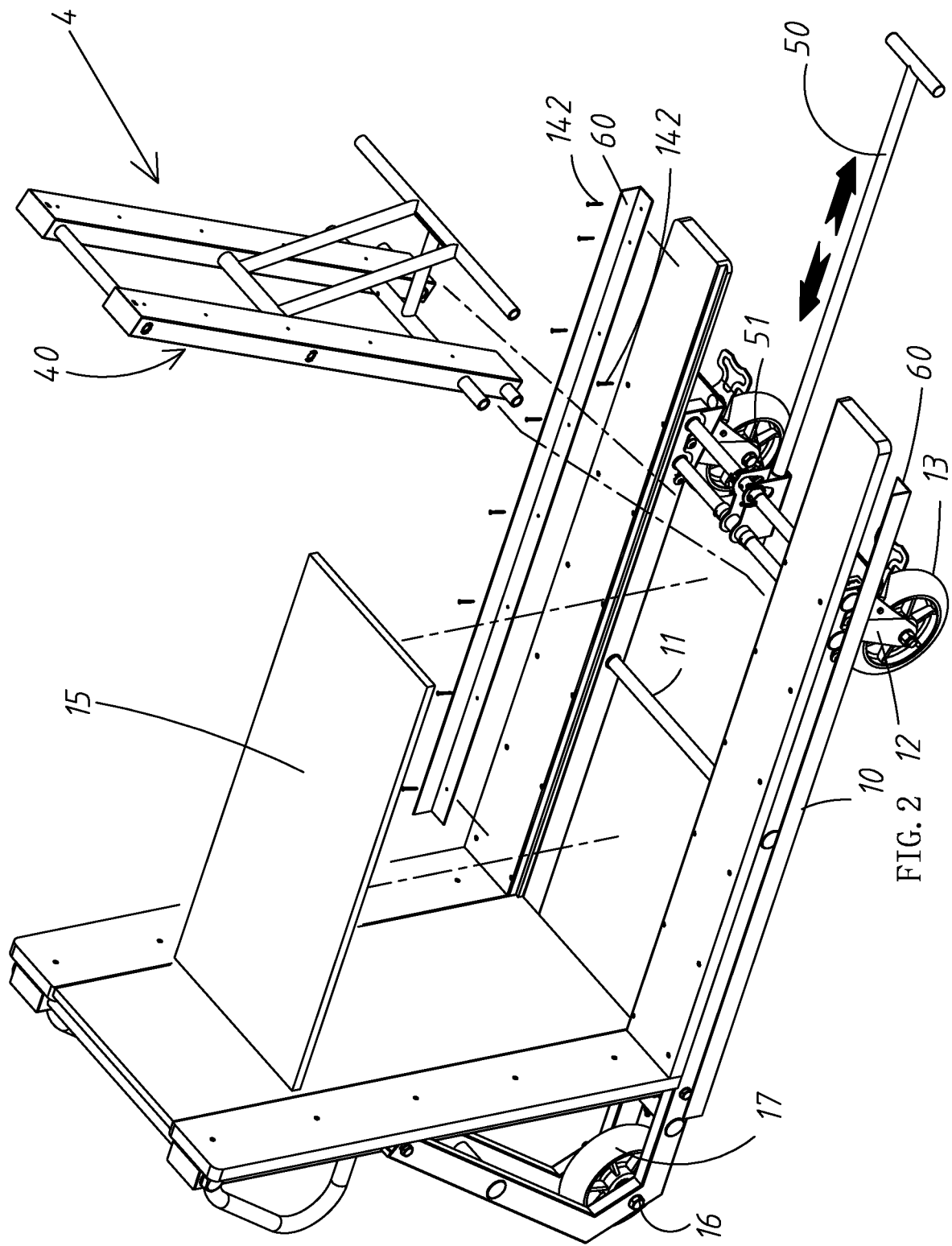
FIG. 2 is a perspective view of FIG. 1 with both the intermediate load-carrying platform and the front limit structure detached.
Figure 3:
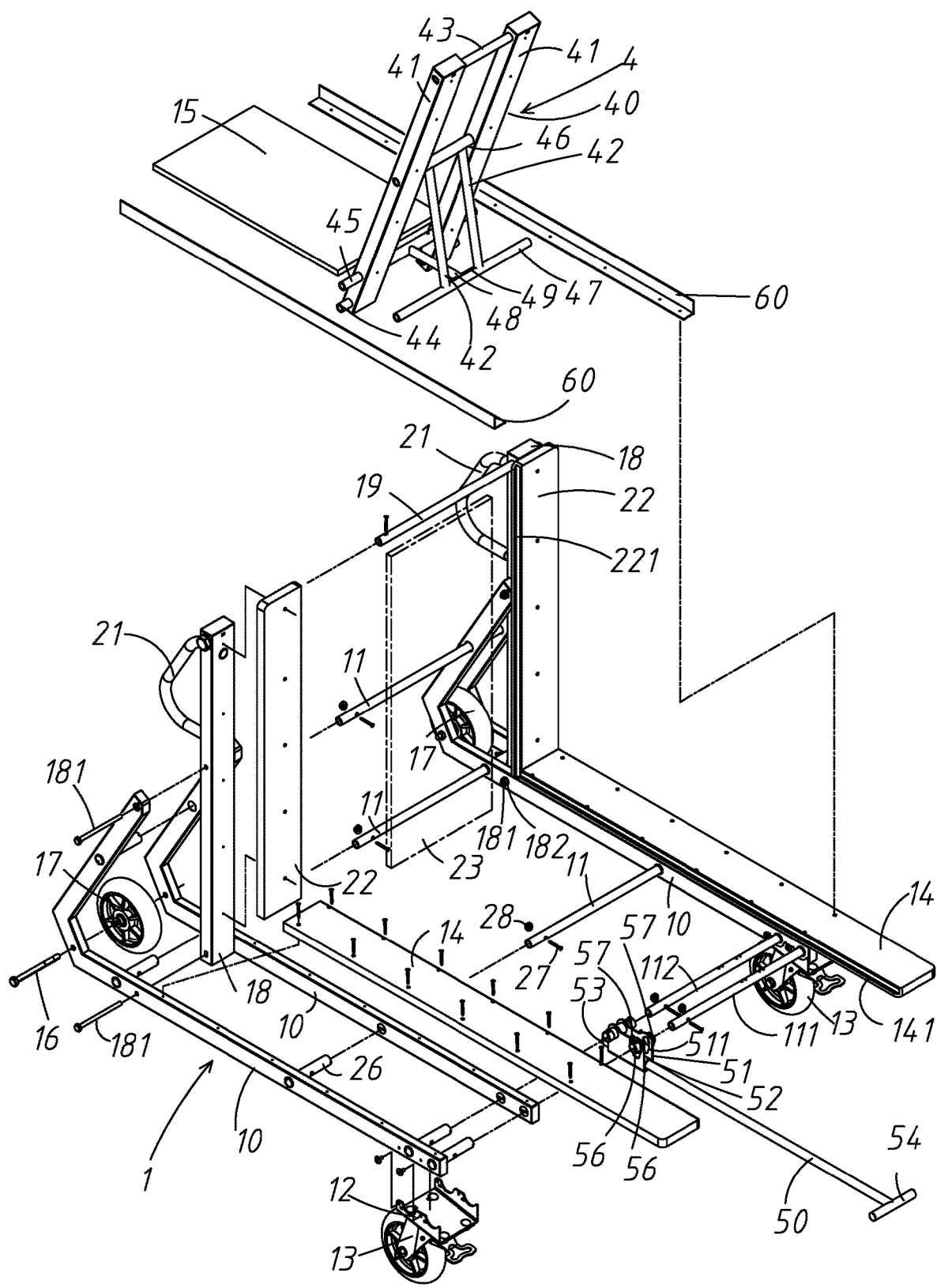
FIG. 3 is an exploded view of FIG. 2.
Figure 4:
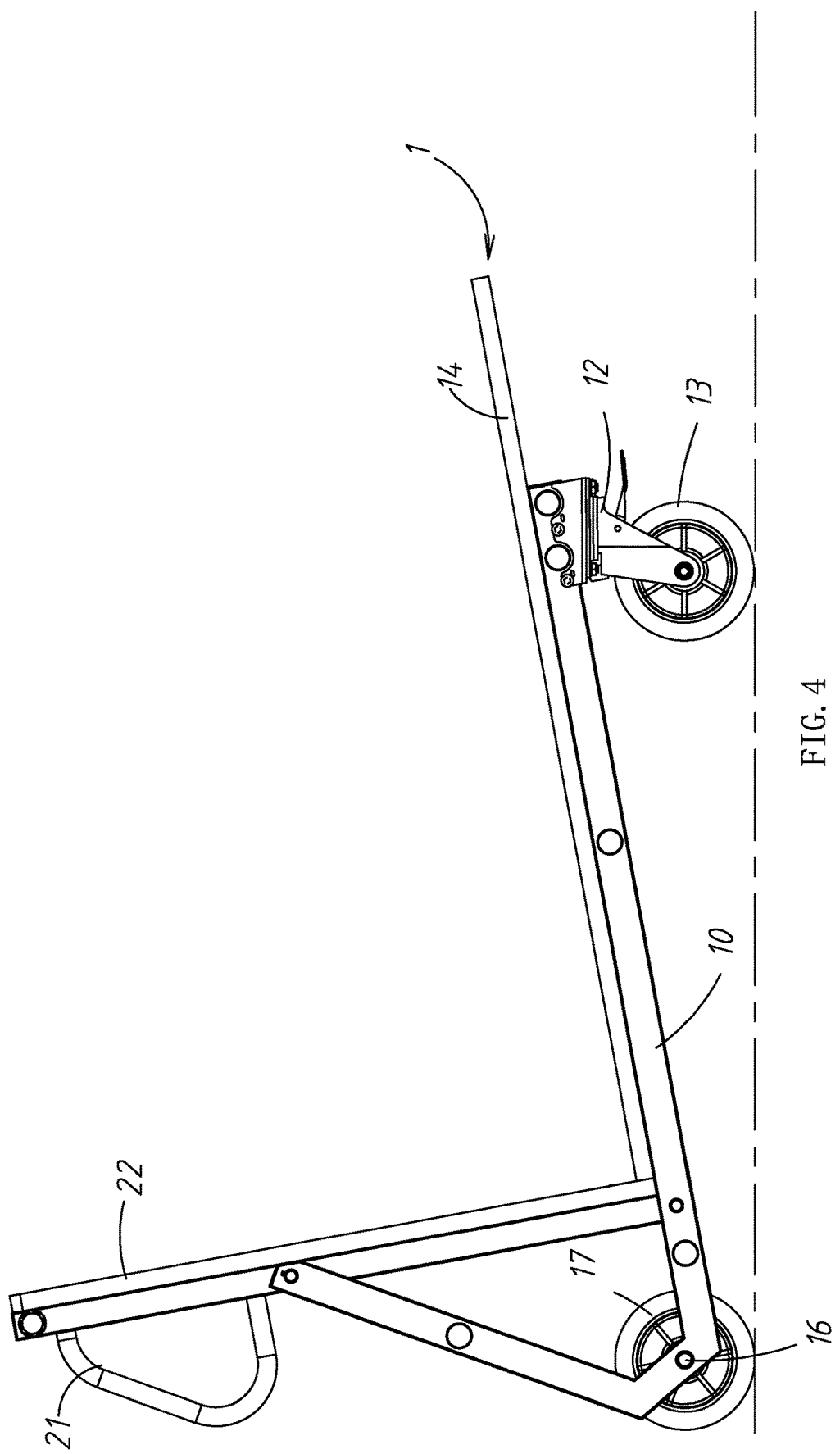
FIG. 4 is a side elevation of FIG. 1 with the front limit structure removed.
Figure 5:
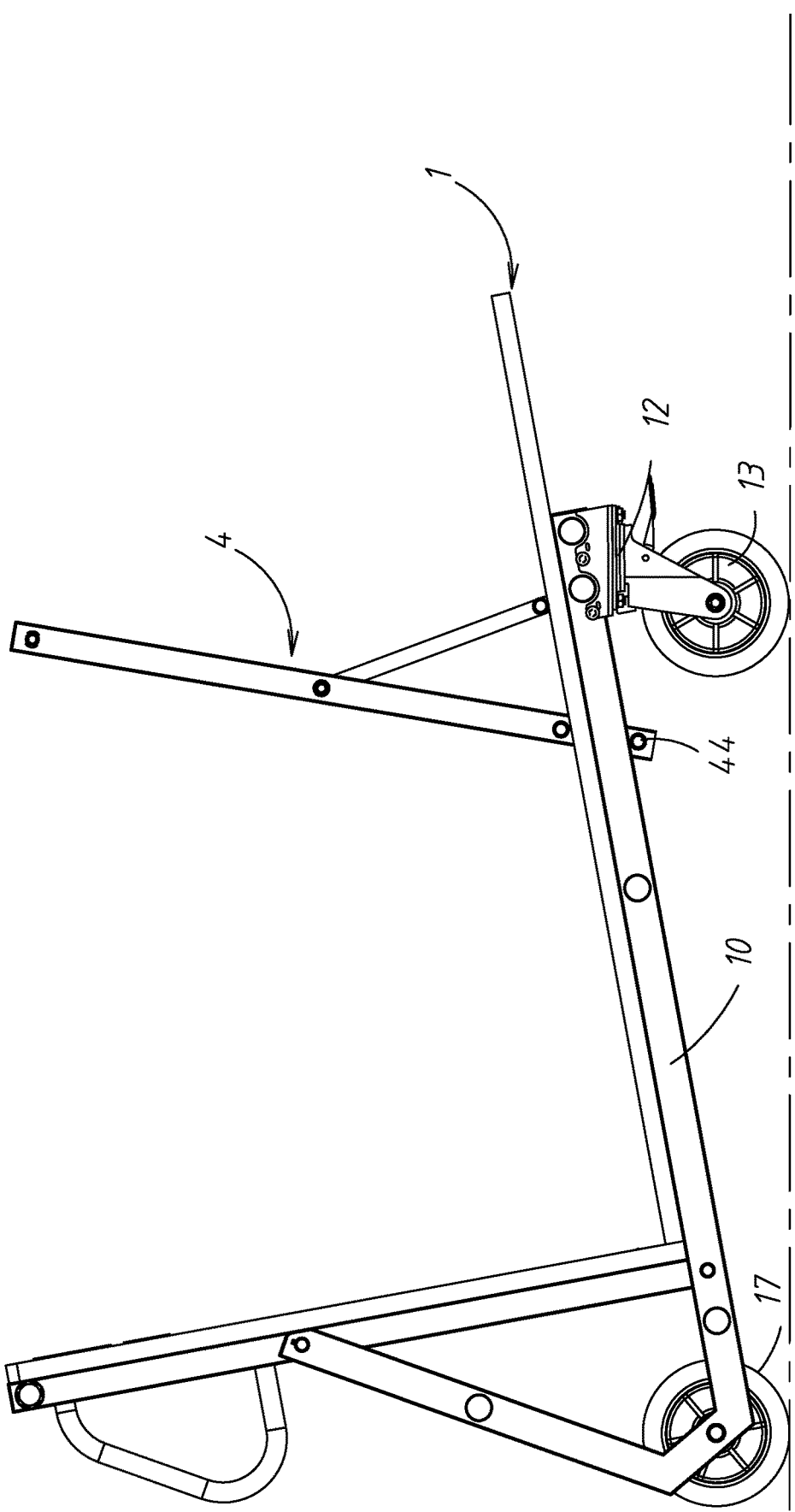
FIG. 5 is a side elevation of FIG. 1.
Figure 6:
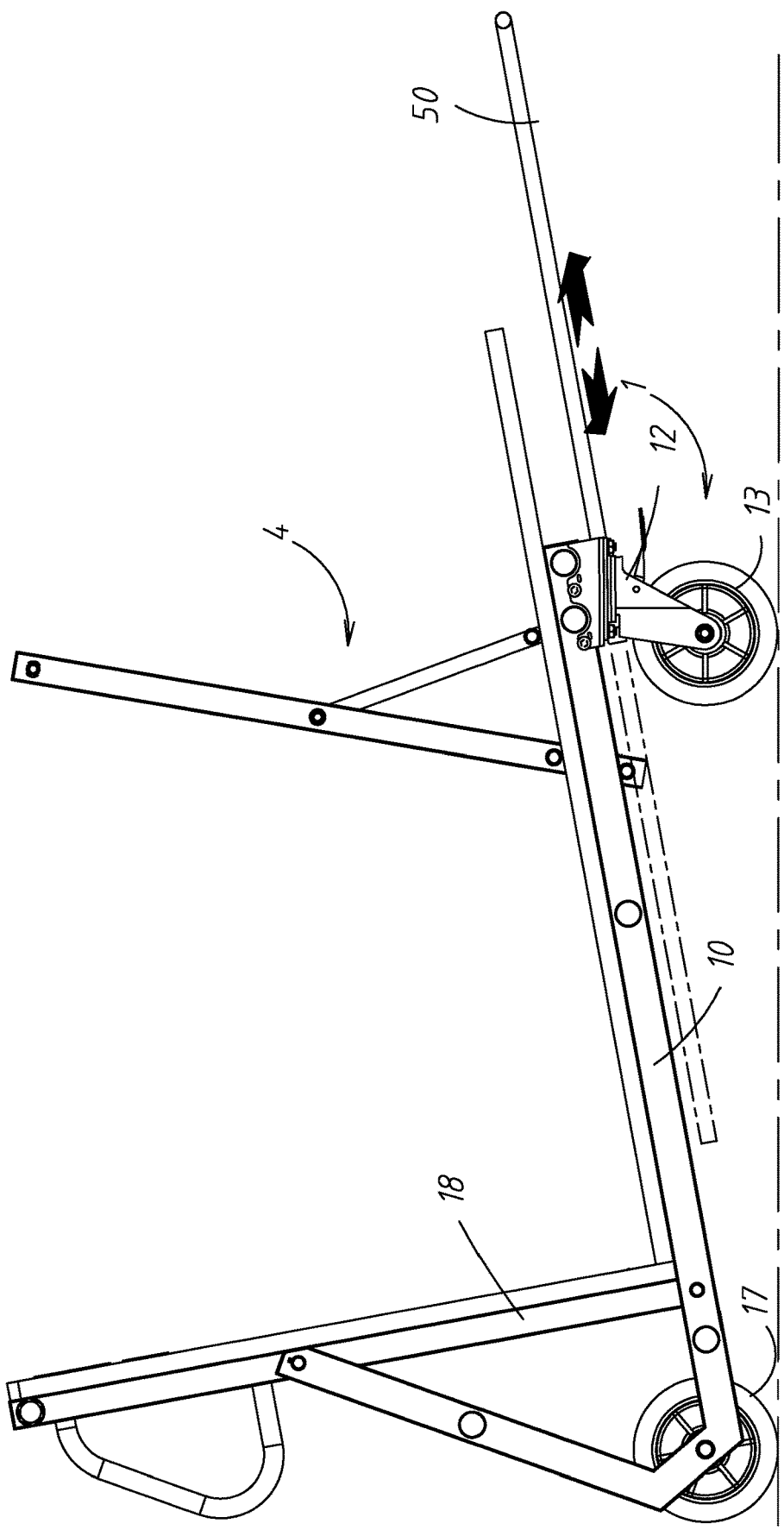
FIG. 6 shows the pulled handle.

Referring to FIGS. 1 to 6 and 9 to 12, an inclined handcart in accordance with a first preferred embodiment of the invention comprises the following components.

A frame 1 includes two sets of two rearward inclined members 10 at two sides respectively, a plurality of links 11 interconnecting the inner rearward inclined members 10 at two sides, a rod 26 interconnecting intermediate portions of the rearward inclined members 10 at either side, an inner end of the rod 26 put on the intermediate one of the links 11 and secured thereto by driving a bolt 27 through the rod 26 and the link 11 to secure to a nut 28, a fastener 29 for securing an end of the rod 26 to the rearward inclined member 10, two wheel mounts 12 at two front corners of the frame 1 respectively, two casters 13 rotatably secured to the wheel mounts 12 respectively, two plate members 14 each mounted on the rearward inclined member 10 of the same side by means of screws 142, the plate member 14 having a shoulder 141 on an inner side, an intermediate load-carrying platform 15 placed on and supported by the shoulders 141 and the intermediate link 11, two axles 16 each driving through a rear bent end of the outer rearward inclined member 10 of either side, a wheel 17, a rear bent end of the inner rearward inclined member 10 of the same side so that the wheel 17 may wheel on the ground, two columns 18 each fastened between rear portions of the rearward inclined members 10 of the same set in front of the wheel 17 by means of a screw 181 and a bolt 182, a rear bar 19 interconnecting the columns 18, two arc rods 21 each disposed on a rear surface of the column 18, two back plates 22 each threadedly secured to the column 18, each back plate 22 having a shoulder 221 on an inner side, the shoulder 221 having a lower end attached to the shoulder 141 of the same side, and a back board 23 mounted on the shoulders 221.

A limit mechanism 4 is mounted at a front portion of the handcart and includes a limit structure 40, two parallel columns 41 on a front portion, an upper member 43 interconnecting upper ends of the columns 41, a lower member 45 interconnecting lower ends of the columns 41, the lower member 45 having two ends placed on the plate members 14 respectively, a large board 30 is mounted on the columns 41, two parallel inclined brackets 42 having upper ends attached to a pivot bar 46 having two ends pivotably secured to intermediate portions of the columns 41 respectively, and two lower ends attached to a lower bar 47 having two ends placed on the plate members 14 respectively, an interconnecting bar 48 having a first end attached to a center of the lower member 45 and a second end formed with an elongated, curved engagement member 49 complimentarily engaged with the lower bar 47, two screws 492 driven through two holes 491 of the engagement member 49 to fasten the engagement member 49 and the lower bar 47 together, two spring biased sliding rods 44 each mounted at a lower end of the column 41, the sliding rod 44 including a shaft 442 disposed through an inner side hole 415 and an outer side hole 414 of the column 41, an end of the shaft 442 being in sliding contact with the inner rearward inclined member 10, a positioning pin 443 driven through the shaft 442, a spring 441 put on the shaft 442 and biased between the positioning pin 443 and an inner surface of the inner side hole 415 of the column 41, and a lock pin 444 driven through an outer end of the shaft 442 and locked in a lock groove 413 of the outer side hole 414 to lock the sliding rod 44. At this position, the columns 41 may move lengthwise. In response to disengaging the lock pin 444 from the lock groove 413, the energized spring 441 expands to move the free shaft 442 outward relative to the inner side hole 415 and the outer side hole 414 until the positioning pin 443 is stopped by the inner surface of the column 41. Thus, the lower member 45 and the lower bar 47 together clamp the rearward inclined members 10.

A seat 51 has a U-shaped longitudinal section and includes two opposite oval slots 511 through front portions of two sides respectively. The seat 5 has a rear portion pivotably provided on a first link member 112 and a second link member 111 is moveably disposed through the oval slots 511. Both the first link member 112 and the second link member 111 interconnect the inner rearward inclined members 10 at two sides. A sleeve 52 is disposed through a bottom of the seat 11. A handle 50 is moveably disposed through the sleeve 52. The sleeve 52 includes a 90-degree bent groove 521 at a rear end or a front end. The handle 50 includes a limit element 53 (e.g., a pin) provided at an end of the groove 521 when the handle 50 is locked, i.e., preventing the handle 53 from being pulled. The handle 50 has a T-shaped head 54. A person may rotate the handle 50 until the limit element 53 is free to move lengthwise, i.e., the handle 50 unlocked. Then the person may pull the handle 50 out of the sleeve 52 in a pulling operation. The handle 50 together with the seat 11 can be pivoted upward after being sufficiently pulled. To the contrary, the person may push the handle 50 into the sleeve 52 until the head 54 is stopped by the sleeve 52 in a non-use position. The seat 51 further comprises two top protrusions 56 adjacent to each oval slot 511. A tension spring 57 has two ends fastened at the protrusions 56 respectively. The second link member 111 is supported by the tension spring 57. Thus, after the handle 50 has been downward pivoted to a horizontal position, the handle 50 is supported by the tension spring 57 without being in contact with the ground.

An elongated 90-degree bent member 60 is secured to each plate member 14 by means of screws 142. The seat 51 is pivotably supported by the second link member 111.

Figure 7:
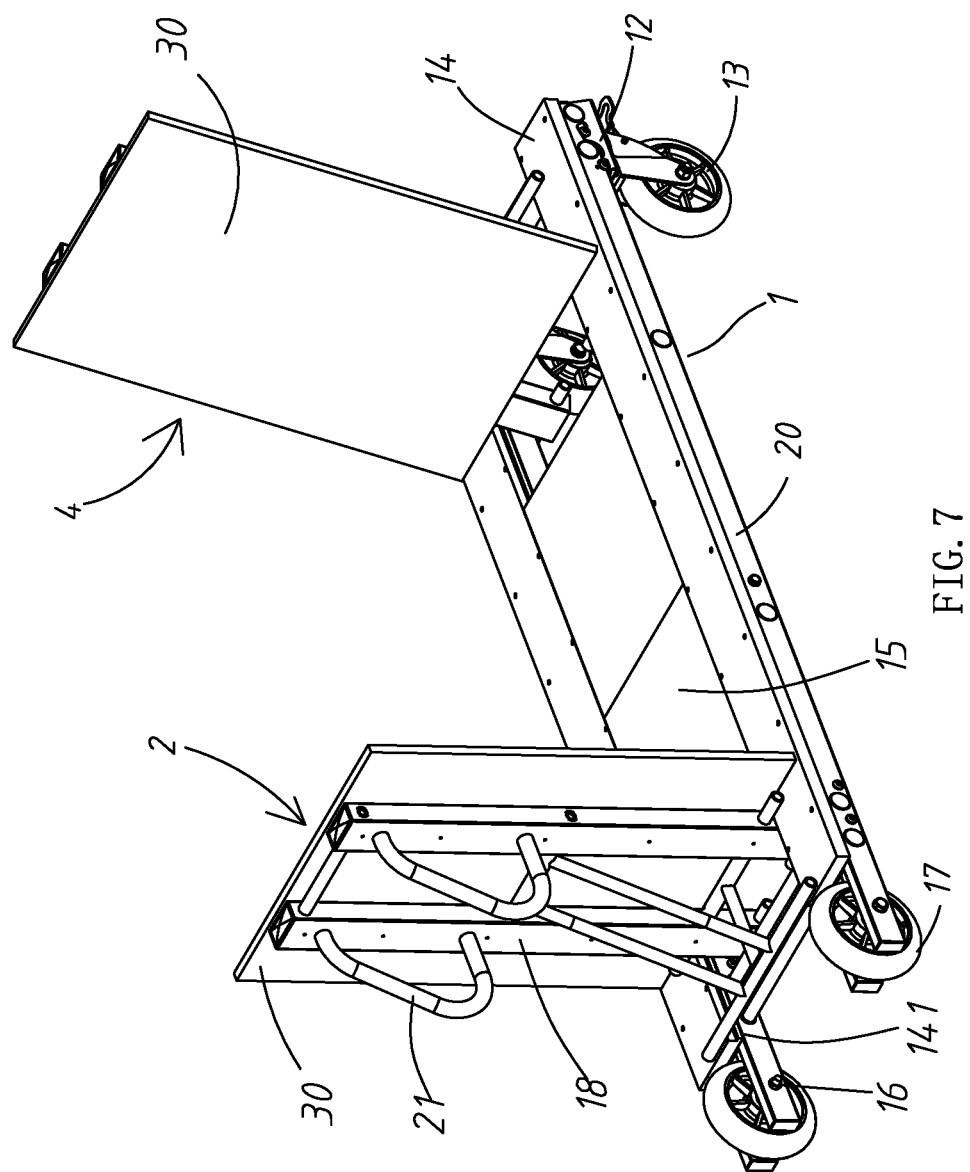
FIG. 7 is a perspective view of an inclined handcart according to a second preferred embodiment of the invention.
Figure 8:
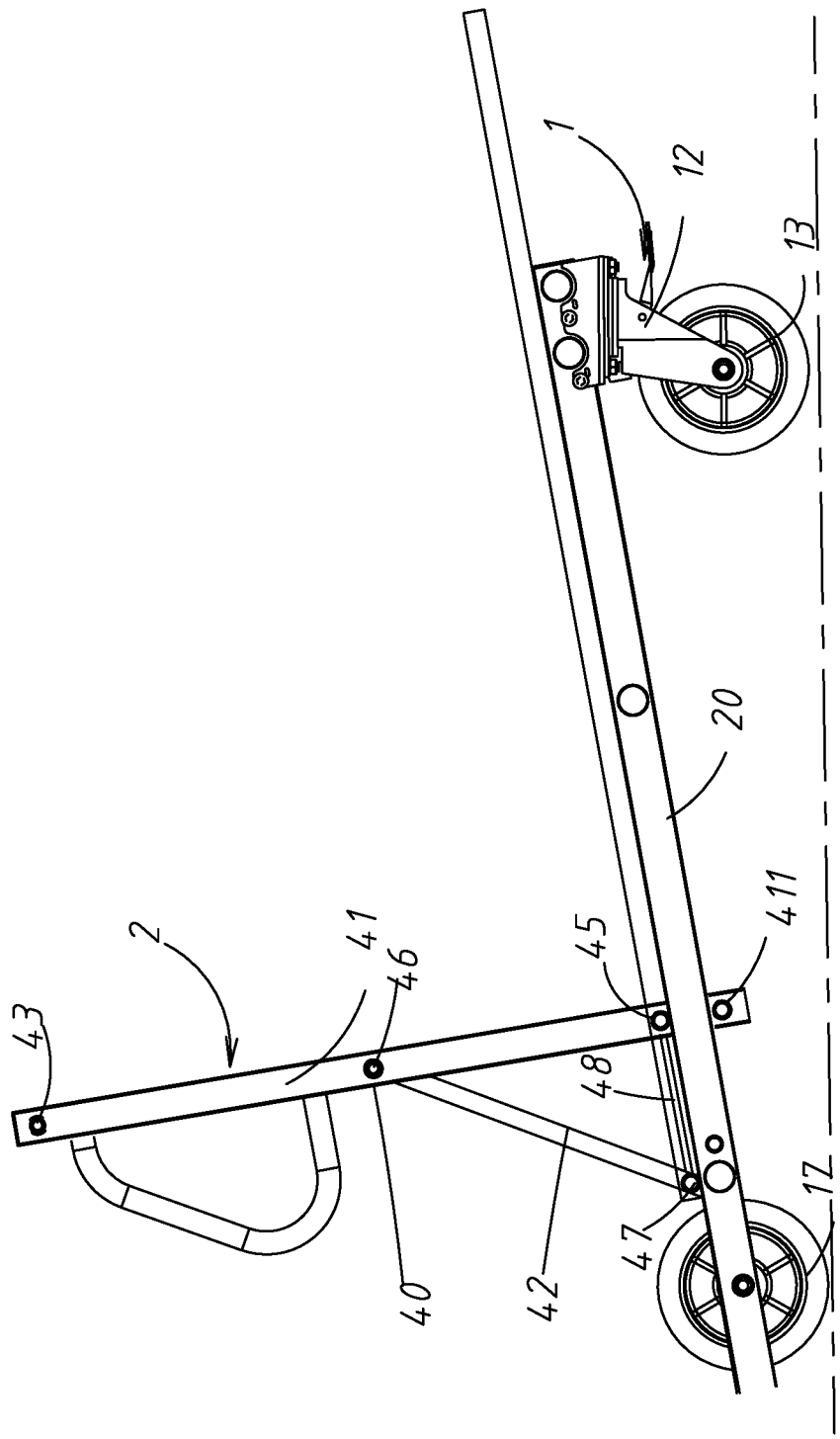
FIG. 8 is a side elevation of FIG. 7 with the front limit structure removed and showing a second configuration of the rear limit structure.
Figure 10:
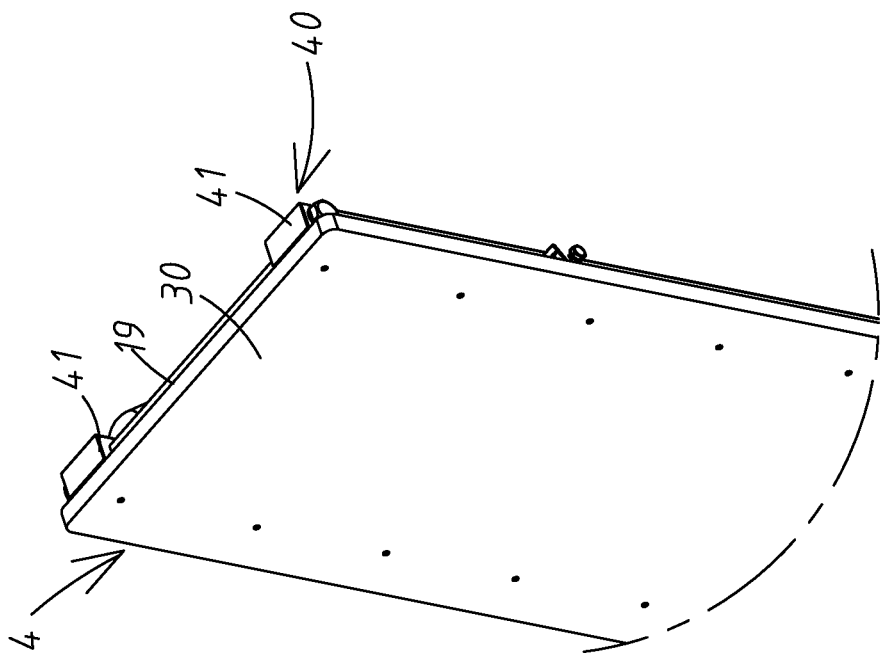
FIG. 10 is an enlarged perspective view of the front limit structure.
Figure 9:
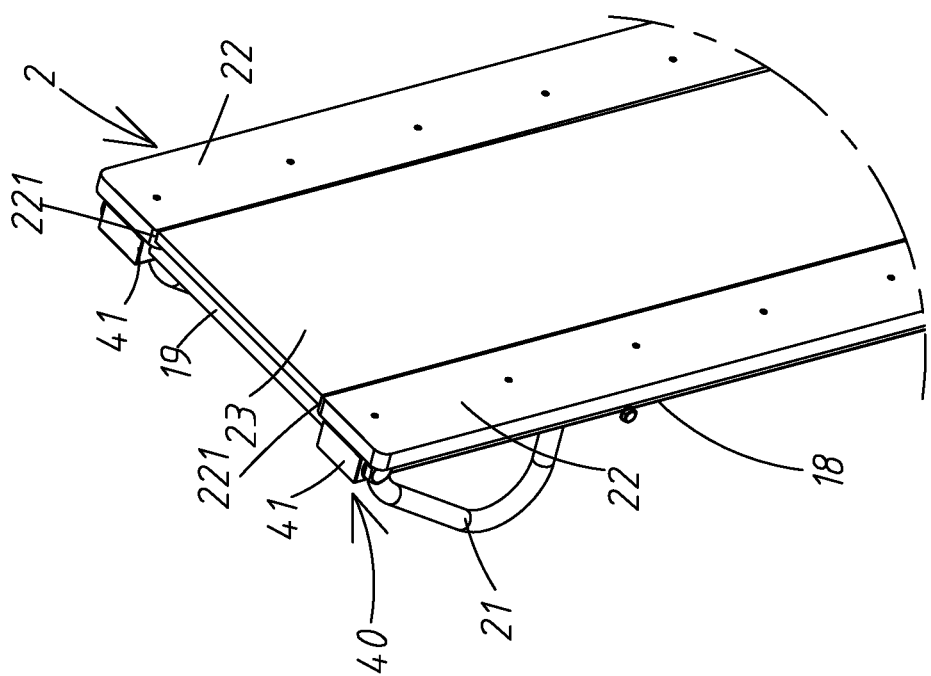
FIG. 9 is an enlarged perspective view of the rear limit structure.
Figure 11B:
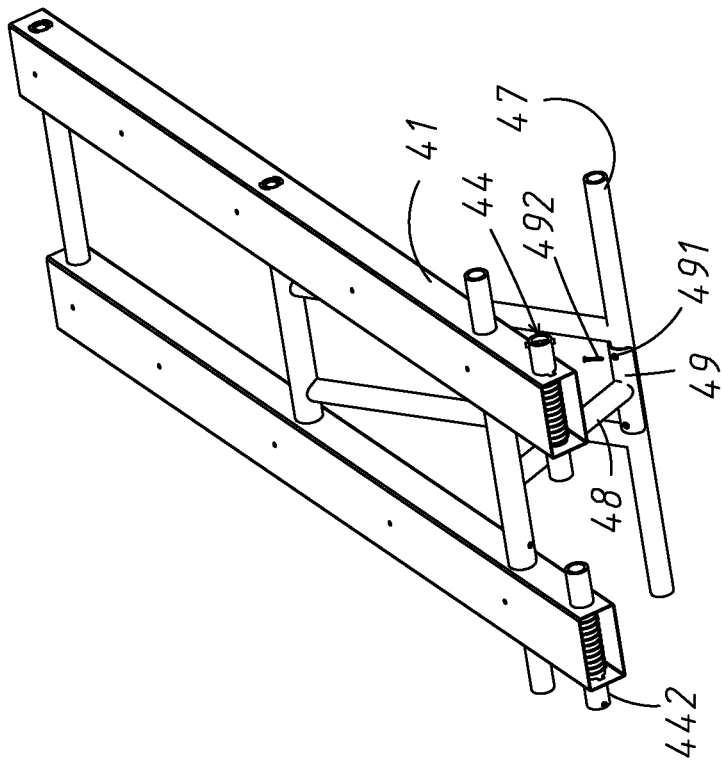
FIG. 11B shows the sliding rods being unlocked and ready to clear the through holes.
Figure 11:
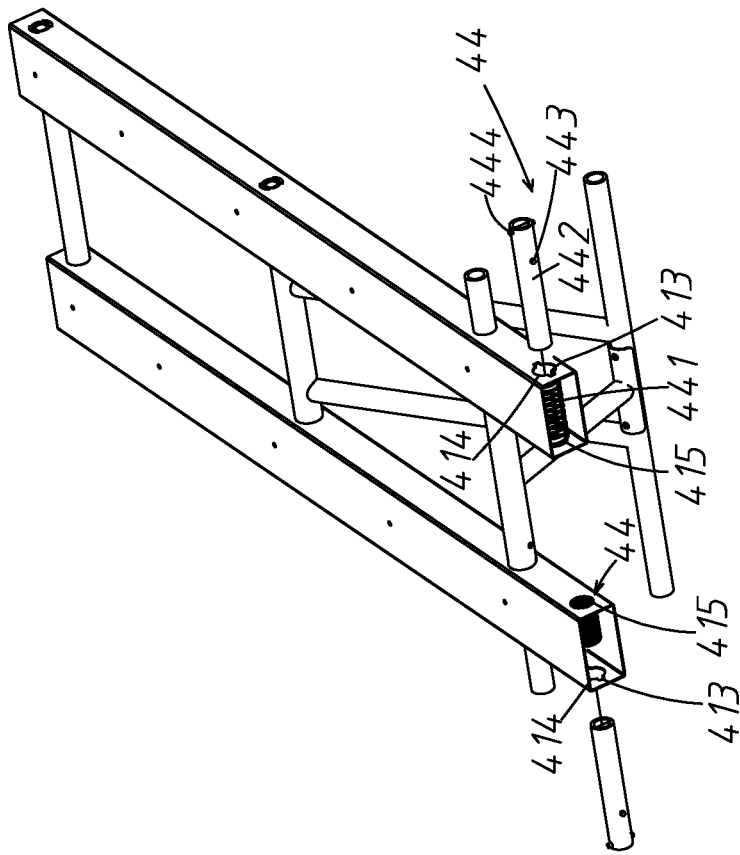
FIG. 11 is a perspective view of the rear limit structure showing the sliding rods about to insert into the through holes.
Figure 11A:
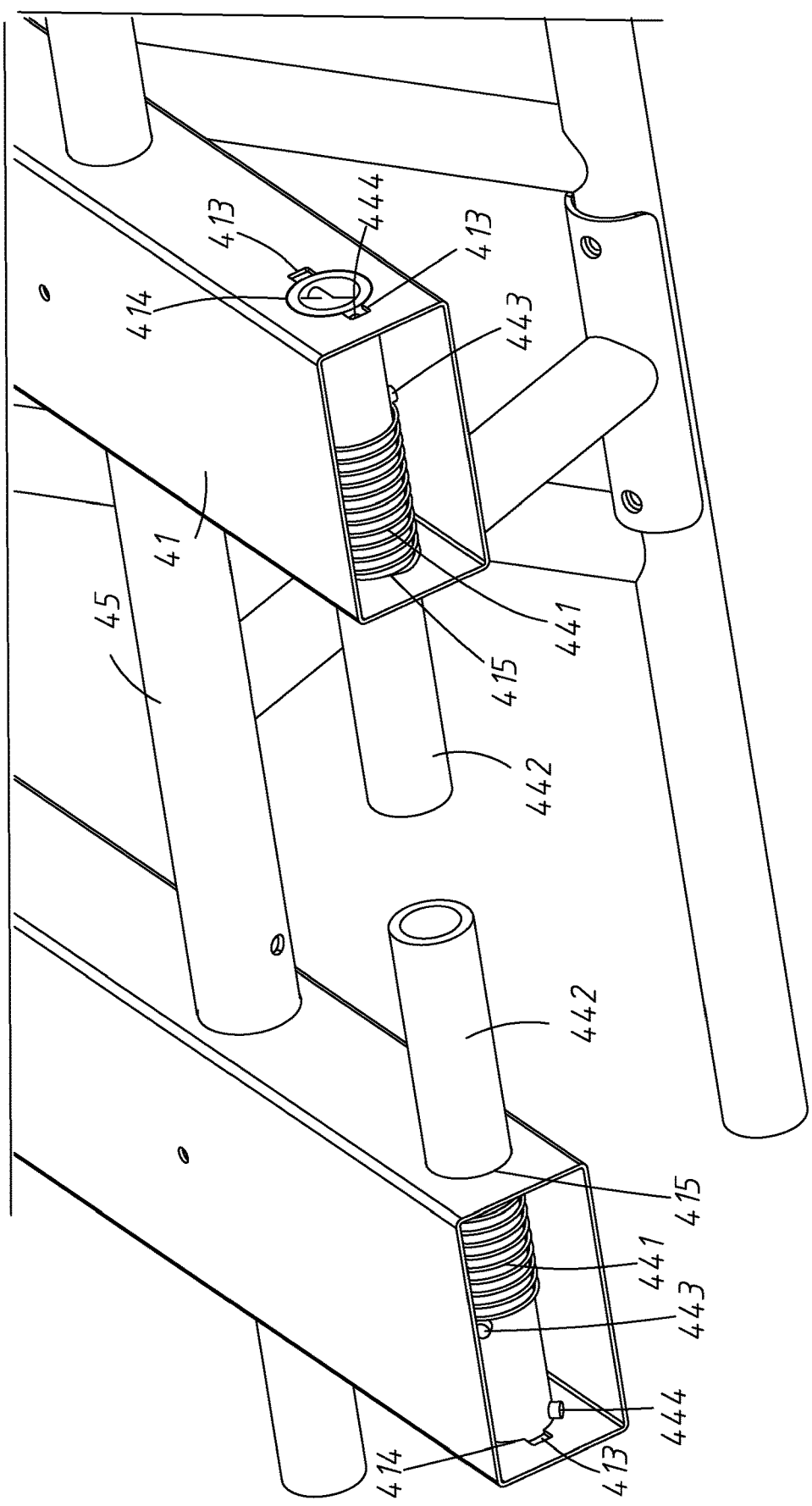
FIG. 11A shows the sliding rods inserted into the through holes to be held in place.
Figure 11C:
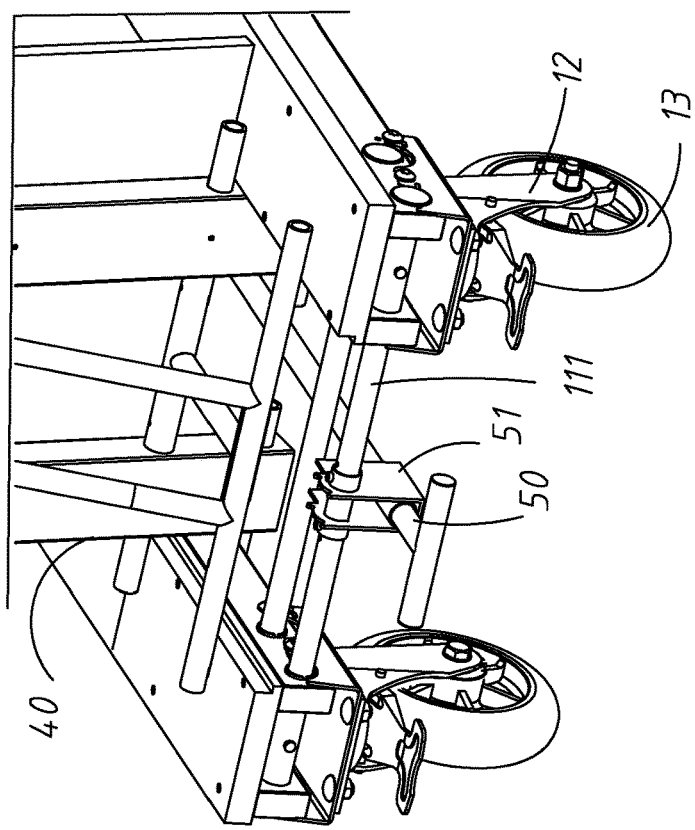
FIG. 11C shows the sliding rod and adjacent components.
Figure 12:
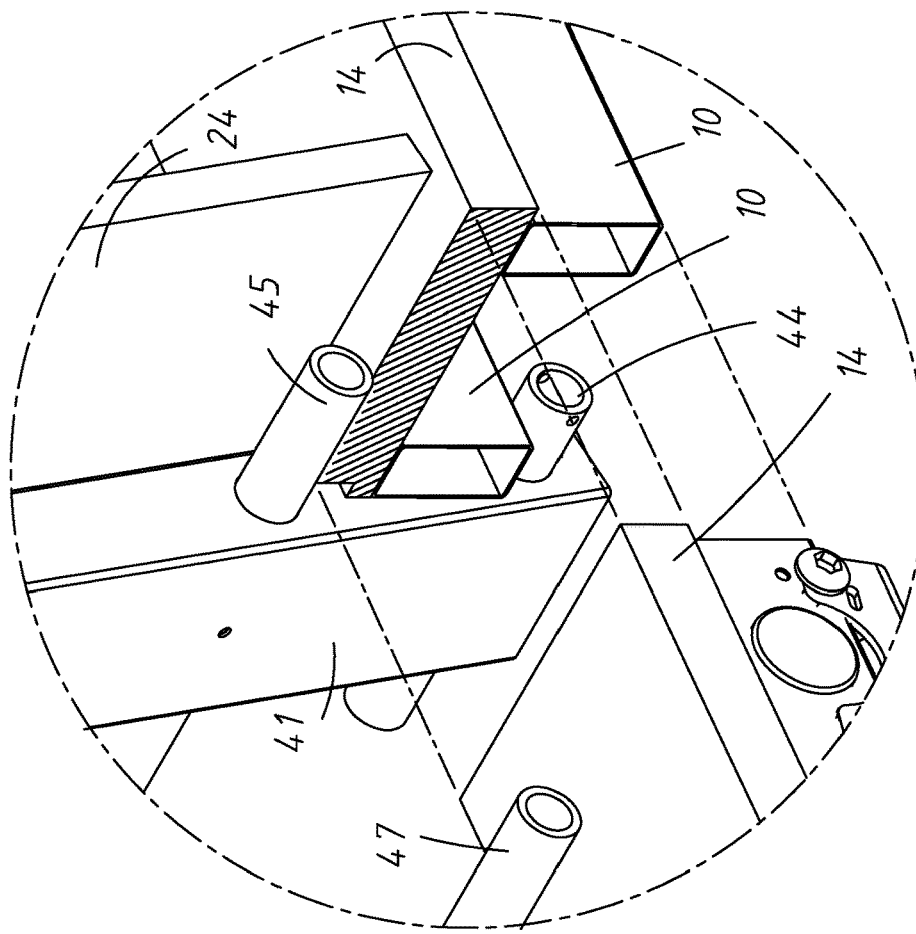
FIG. 12 shows the handle being fully retracted, and the seat being secured to a single link.

Referring to FIGS. 7 and 8, an inclined handcart in accordance with a second preferred embodiment of the invention is shown. The characteristics of the second preferred embodiment are substantially the same as that of the first preferred embodiment except the following: two rearward inclined members 20 at two sides respectively. The bent rear portion of the rearward inclined member 20 is removed. The wheels 17 are rotatably mounted at rear ends of the rearward inclined members 20 respectively.

Figure 13:
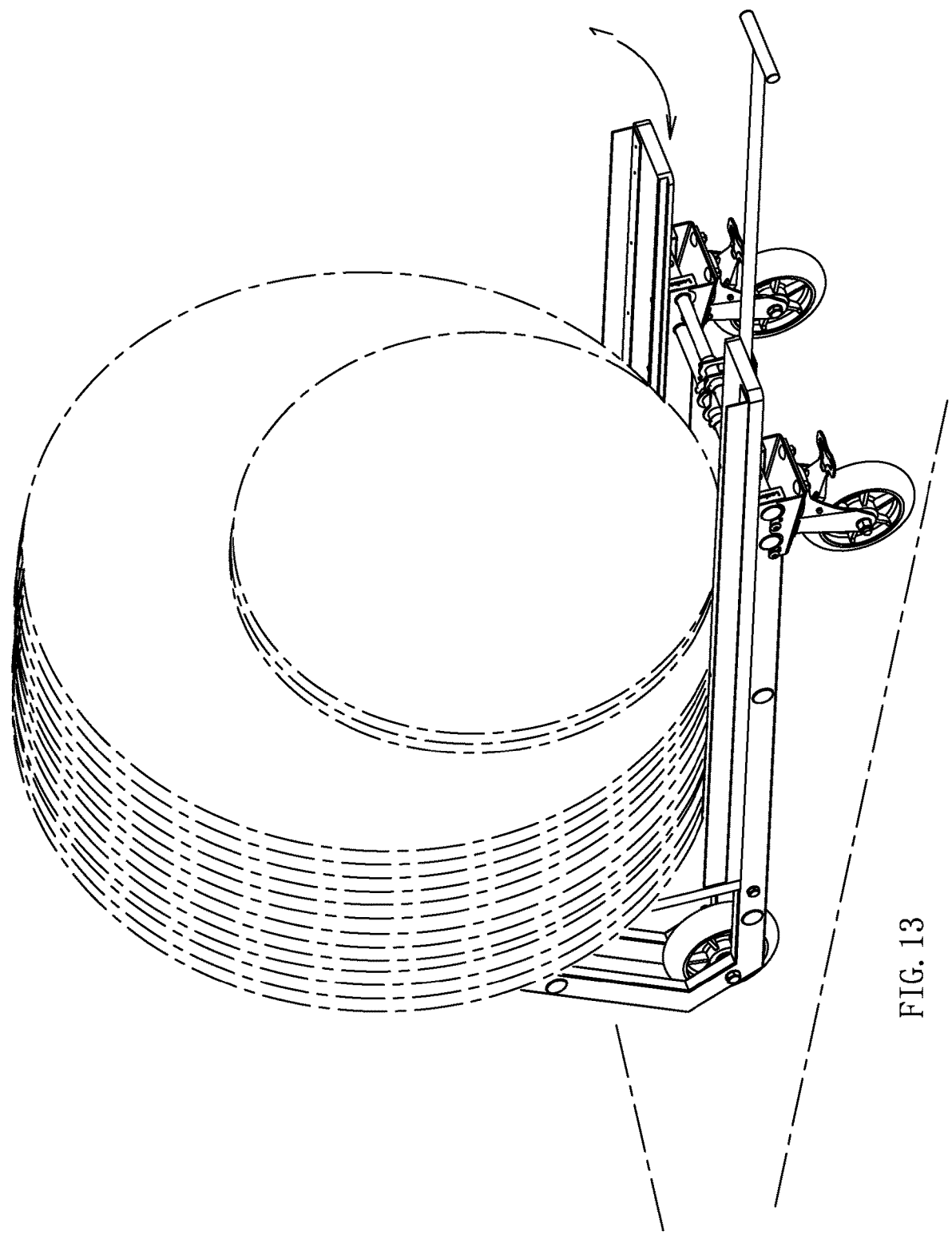
FIG. 13 is a perspective view of the handcart showing disc-shaped articles placed on the platform for transportation and the limit mechanism removed.

Referring to FIG. 13, it shows disc-shaped articles placed on the platform for transportation with the limit mechanism removed.

Figure 13A:
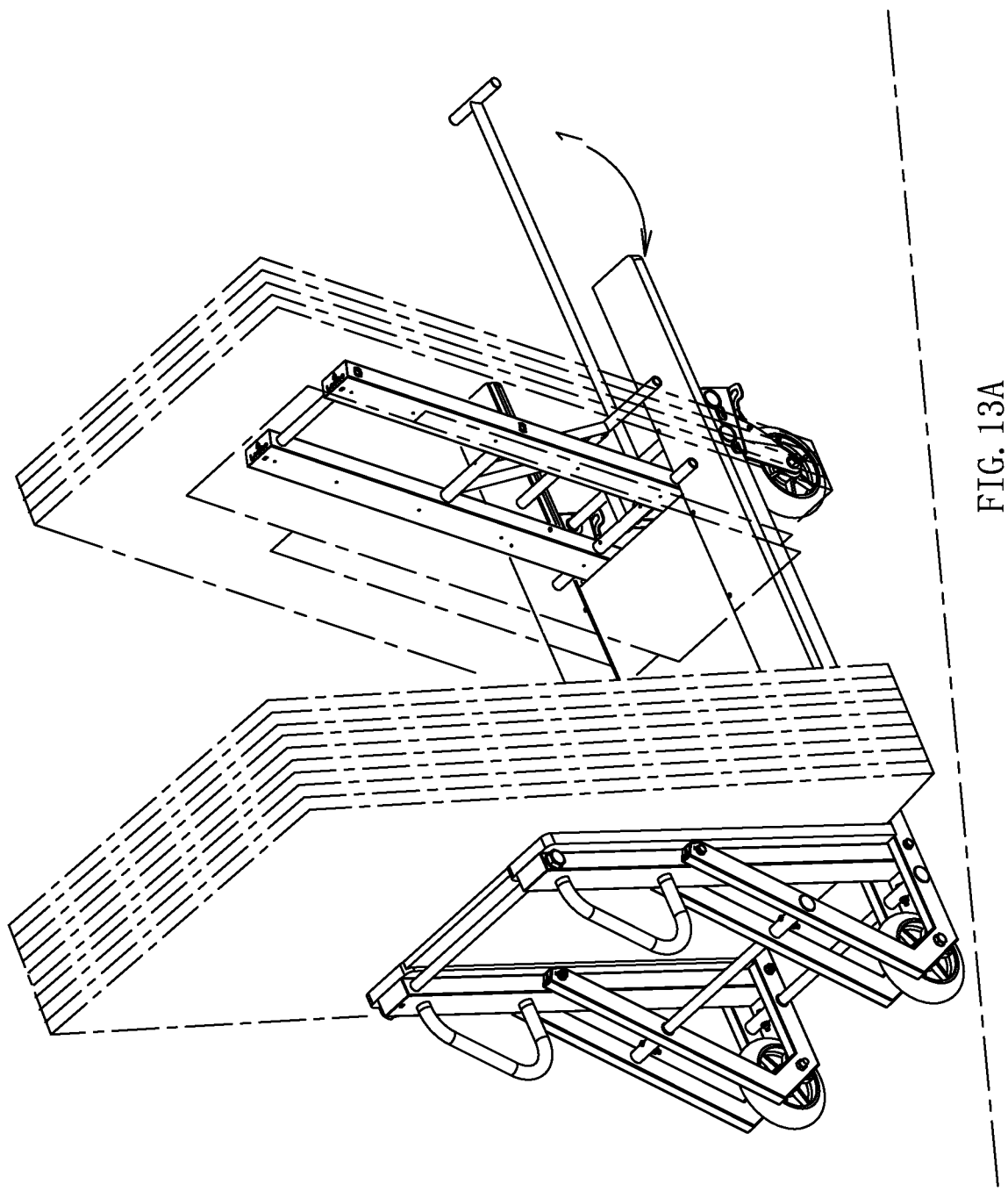
FIG. 13A is a perspective view of the handcart showing rectangular articles being placed on the platform for transportation.

Referring to FIG. 13A, it shows some rectangular articles placed on the platform and leaned on the limit mechanism, and another some rectangular articles placed on the platform and leaned on the back plates and the back board all for transportation.

Figure 13B:
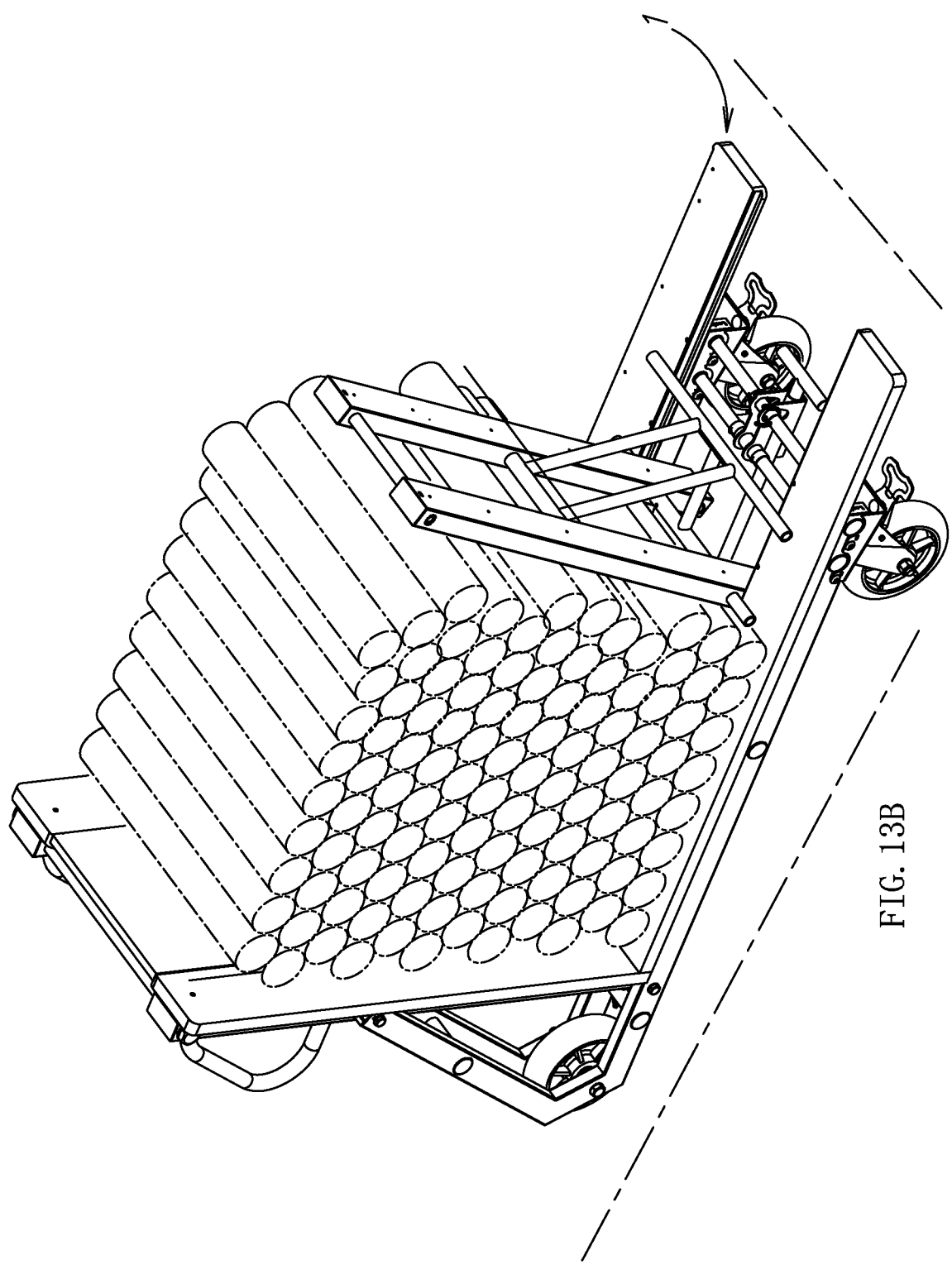
FIG. 13B is a perspective view of the handcart showing pipes being placed on the platform for transportation.

Referring to FIG. 13B, it shows pipes disposed in a space defined by the platform, the limit mechanism, the back plates and the back board for transportation.

While the invention has been described in terms of preferred embodiments, those skilled in the art will recognize that the invention can be practiced with modifications within the spirit and scope of the appended claims.

What is claimed is:

1. An inclined handcart, comprising:
   a frame including two hook-shaped rearward inclined members at two sides respectively;
   two wheel mounts secured to bottoms of two front corners of the frame respectively;
   two rear wheels rotatably secured to two rear ends of the rearward inclined members respectively;
   two front casters rotatably secured to the wheel mounts respectively;
   a plurality of links interconnecting the rearward inclined members;
   two plate members mounted on the rearward inclined members respectively, each plate member having a shoulder extending inward; and
   a first limit board extending from the rear ends of the rearward inclined members.

2. The inclined handcart of claim 1, further comprising a limit mechanism including two parallel columns extending from front portions of the rearward inclined members, a second limit board secured to the columns, a lower member interconnecting lower ends of the columns, the lower member having two ends placed on the plate members respectively, two parallel inclined brackets having upper ends attached to a pivot bar pivotably secured to intermediate portions of the columns respectively, and two lower ends attached to a lower bar having two ends placed on the plate members respectively, an interconnecting bar having a first end attached to the lower member and a second end formed with an elongated, curved engagement member secured to the lower bar, and two sliding rods disposed at the lower ends of the columns respectively, each sliding rod including a shaft disposed through an inner side hole and an outer side hole of the column, the shaft having an end in contact with the rearward inclined member, a positioning pin driven through the shaft, a biasing member put on the shaft and biased between the positioning pin and an inner surface of the inner side hole of the column, and a lock pin configured to drive through an outer end of the shaft and in a lock groove of the outer side hole to lock the sliding rod so that in the locked position, the columns are configured to move in a direction of length of the frame in response to disengaging the lock pin from the lock groove, the biasing member expands to move the shaft outward relative to the inner side hole and the outer side hole until the positioning pin is stopped by the inner surface of the column, so that the lower member and the lower bar together clamp the rearward inclined members.

3. The inclined handcart of claim 2, further comprising a large board mounted on the columns.

4. The inclined handcart of claim 2, further comprising a large board mounted on each of the columns.

5. The inclined handcart of claim 4, wherein each plate member includes a shoulder on an inner side, further comprising an intermediate load-carrying platform is placed on and supported by the shoulders.

6. The inclined handcart of claim 1, wherein the straight portions of the rearward inclined members are provided with a U-shaped seat, further comprising a retractable handle having a rear end pivotably secured to the seat.

7. The inclined handcart of claim 6, wherein the seat is pivotally secured to the links, the handle horizontally extends forward out of the seat, the handle includes a rear limit element and a front head.

8. The inclined handcart of claim 6, wherein the seat is connected to a pair of the links, the seat is pivotably secured to the inner one of the links, the seat includes two oval slots pivotably secured to the outer one of the links, the handle horizontally extends out of the seat, the handle includes a rear limit element and a front head, the seat further comprises two projections, a tension spring having two ends fastened at the protrusions respectively, and a second link member supported by the tension spring so that after the handle has been downward pivoted to a horizontal position, the handle is supported by the tension spring without being in contact with the ground.

9. The inclined handcart of claim 6, further comprising a sleeve disposed through a bottom of the seat, and wherein the handle is moveably disposed through the sleeve.

10. The inclined handcart of claim 9, further comprising two plate members each mounted on the rearward inclined member of the same side.

11. The inclined handcart of claim 10, further comprising an elongated 90-degree bent member is secured to the plate member.

12. The inclined handcart of claim 10, wherein each plate member includes a shoulder on an inner side, further comprising an intermediate load-carrying platform placed on and supported by the shoulders.

13. The inclined handcart of claim 2, further comprising two back plates each secured to the column.

14. The inclined handcart of claim 13, wherein each back plate includes a shoulder on an inner side, further comprising a back board mounted on the shoulders.

15. The inclined handcart of claim 2, further comprising two arc rods each disposed on a rear surface of the column.

16. An inclined handcart, comprising:
a frame including two rearward inclined members at two sides respectively;
two wheel mounts secured to bottoms of two front corners of the frame respectively;
two rear wheels rotatably secured to two rear ends of the rearward inclined members respectively;
two front casters rotatably secured to the wheel mounts respectively;
a plurality of links interconnecting the rearward inclined members;
two plate members mounted on the rearward inclined members respectively, each plate member having a shoulder extending inward; and
a first limit board extending from rear ends of the rearward inclined members.

17. The inclined handcart of claim 16, wherein a seat is connected to a pair of the links, the seat is pivotably secured to the inner one of the links, the seat includes two oval slots pivotably secured to the outer one of the links, the handle horizontally extends out of the seat, the handle includes a rear limit element and a front head, the seat further comprises two projections, a tension spring having two ends fastened at the protrusions respectively, and a second link member supported by the tension spring so that after the handle has been downward pivoted to a horizontal position, the handle is supported by the tension spring without being in contact with the ground.

18. The inclined handcart of claim 16, further comprising a limit mechanism including two parallel columns extending from front portions of the rearward inclined members, a second limit board secured to the columns, a lower member interconnecting lower ends of the columns, the lower member having two ends placed on the plate members respectively, two parallel inclined brackets having upper ends attached to a pivot bar pivotably secured to intermediate portions of the columns respectively, and two lower ends attached to a lower bar having two ends placed on the plate members respectively, an interconnecting bar having a first end attached to the lower member and a second end formed with an elongated, curved engagement member secured to the lower bar, and two sliding rods disposed at the lower ends of the columns respectively, each sliding rod including a shaft disposed through an inner side hole and an outer side hole of the column, the shaft having an end in contact with the rearward inclined member, a positioning pin driven through the shaft, a biasing member put on the shaft and biased between the positioning pin and an inner surface of the inner side hole of the column, and a lock pin configured to drive through an outer end of the shaft and in a lock groove of the outer side hole to lock the sliding rod so that in the locked position, the columns are configured to move in a direction of length of the frame in response to disengaging the lock pin from the lock groove, the biasing member expands to move the shaft outward relative to the inner side hole and the outer side hole until the positioning pin is stopped by the inner surface of the column, so that the lower member and the lower bar together clamp the rearward inclined members.

19. The inclined handcart of claim 18, further comprising two back plates each secured to the column, each back plate having a shoulder on an inner side, and a back board mounted on the shoulders, further comprising two plate members each having a shoulder on an inner side, and further comprising an intermediate load-carrying platform placed on and supported by the shoulders.

* * * * *